United States Patent [19]
Mulholland

[11] Patent Number: 6,068,141
[45] Date of Patent: May 30, 2000

[54] PUSH BACK STORAGE RACK SYSTEM

[75] Inventor: Anthony G. Mulholland, Mississauga, Canada

[73] Assignee: Econo-Rack Storage Equipment Limited, Mississauga, Canada

[21] Appl. No.: 09/039,803

[22] Filed: Mar. 16, 1998

[51] Int. Cl.[7] .............................. A47F 5/00; B65G 1/10
[52] U.S. Cl. .................... 211/151; 211/59.2; 414/276
[58] Field of Search .................................. 211/151, 162, 211/59.2; 414/276, 286

[56] References Cited

U.S. PATENT DOCUMENTS

| | | |
|---|---|---|
| 4,168,780 | 9/1979 | Parrott ....................................... 211/151 |
| 4,341,313 | 7/1982 | Doring . |
| 4,462,500 | 7/1984 | Konstant et al. . |
| 4,613,270 | 9/1986 | Konstant et al. ........................ 211/151 |
| 4,773,546 | 9/1988 | Konstant . |
| 4,915,240 | 4/1990 | Konstant . |
| 4,949,852 | 8/1990 | Allen . |
| 4,955,489 | 9/1990 | Allen . |
| 4,982,851 | 1/1991 | Konstant . |
| 4,988,251 | 1/1991 | Kinney . |
| 5,080,241 | 1/1992 | Konstant . |
| 5,141,118 | 8/1992 | Gay .......................................... 211/151 |
| 5,170,896 | 12/1992 | Konstant . |
| 5,180,069 | 1/1993 | Krummell et al. . |
| 5,184,738 | 2/1993 | Allen ....................................... 211/151 |
| 5,203,464 | 4/1993 | Allen . |
| 5,316,157 | 5/1994 | Konstant ................................. 211/151 |
| 5,328,038 | 7/1994 | Allen . |
| 5,348,169 | 9/1994 | Allen . |
| 5,415,300 | 5/1995 | Krummell et al. ....................... 211/151 |
| 5,419,444 | 5/1995 | Strom ...................................... 211/151 |
| 5,476,180 | 12/1995 | Konstant ................................. 211/151 |
| 5,567,103 | 10/1996 | Konstant ................................. 211/151 |
| 5,617,961 | 4/1997 | Konstant et al. ........................ 211/151 |
| 5,641,082 | 6/1997 | Grainger ................................. 211/151 |

Primary Examiner—Daniel P. Stodola
Assistant Examiner—Jennifer E. Novosad
Attorney, Agent, or Firm—Baker & Daniels

[57] ABSTRACT

The push back storage rack system comprises a framework defining a storage bay for multiple pallets including a plurality of generally vertical uprights and a plurality of generally horizontal shelf beams. A pair of laterally spaced, generally parallel rails is supported by the framework and extends into the storage bay. Each of the rails defines inner and outer wheel tracks and is inclined in a direction towards the rear of the storage bay. A generally rectangular first cart has a pair of front wheels and a pair of rear wheels. The front and rear wheels roll along the inner wheel tracks. The generally rectangular second cart is positioned behind the first cart and has a pair of front wheels and a pair of rear wheels. The front wheels roll along the outer wheel tracks and the rear wheels roll along the inner wheel tracks. A generally rectangular third cart is positioned behind the second cart and has a pair of front wheels and a pair of rear wheels. The front and rear wheels roll long the outer wheel tracks. The third cart supports a second pair of laterally spaced, generally parallel rails, each of which defines an outwardly facing wheel track. The rear of the second pair of rails is supported by a pair of wheels that roll along the inner wheel tracks. A fourth generally rectangular cart is positioned behind the third cart and has a pair of front wheels and a pair of rear wheels. The front wheels roll along the second pair of rails and the rear wheels roll along the outer wheel tracks. The second pair of rails is oriented such that downward forces placed on the front wheels of the fourth cart inhibit development of a horizontal force component tending to move the fourth cart rearwardly into the storage bay.

19 Claims, 9 Drawing Sheets

PUSH BACK STORAGE RACK SYSTEM

FIELD OF THE INVENTION

The present invention relates to storage racks for pallets and the like and in particular to a push back storage rack system to allow multiple pallets to be stored behind one another.

BACKGROUND OF THE INVENTION

Push back storage rack systems employing rolling carts for carrying pallets or skids are well known in the art and many variations have been considered. For example, U.S. Pat. No. 5,415,300 to Krummel et al. discloses a push back cart storage system including an outer cart having wheels rolling on a pair of laterally spaced, parallel, inclined support rails. A middle cart has forward wheels rolling on side members of the outer cart. The rear wheels on the middle cart roll on the support rails. An inner cart has front wheels rolling on the side members of the middle cart. The rear wheels of the inner cart roll on the support rails.

U.S. Pat. No. 5,184,738 to Allen discloses a storage rack system having a plurality of storage bays adapted to store pallets three, four and five pallets deep. A pair of laterally spaced, parallel, inclined outer tracks extend the full depth of the storage bay while a pair of inclined inner tracks extend partially into the storage bay. A plurality of carts roll along the tracks and support pallets.

Although the above references disclose push back storage rack systems, problems exist. In particular, the design of these push back storage rack systems allows carts to be double loaded with pallets which may result in overloading and damage to the wheels of the carts. Furthermore, the design of the carts requires the depth of the storage rack systems to exceed significantly the actual depth required to store the pallets resulting in wasted space.

Accordingly, there exists a need for an improved push back storage rack system. It is therefore an object of the present invention to provide a novel push back storage rack system.

SUMMARY OF THE INVENTION

According to one aspect of the present invention there is provided a push back storage rack system comprising:

a framework defining a storage bay for multiple pallets including a plurality of generally vertical uprights and a plurality of generally horizontal shelf beams;

a first pair of laterally spaced, generally parallel rails supported by said framework and extending into said storage bay, each of said rails defining inner and outer wheel tracks and being inclined in a direction towards the rear of said storage bay;

a generally rectangular first cart having a pair of front wheels and a pair of rear wheels, said front and rear wheels rolling along said inner wheel tracks;

a generally rectangular second cart behind said first cart and having a pair of front wheels and a pair of rear wheels, said front wheels rolling along said inner wheel tracks and said rear wheels rolling along said outer wheel tracks;

a generally rectangular third cart behind said second cart and having a pair of front wheels and a pair of rear wheels, said front and rear wheels rolling along said outer wheel tracks, said third cart supporting a second pair of laterally spaced, generally parallel rails, each rail of said second pair defining an outwardly facing wheel track, the rear of said second pair of rails being supported by a pair of wheels rolling along said inner wheel tracks; and a fourth generally rectangular cart behind said third cart and having a pair of front wheels and a pair of rear wheels, said front wheels rolling along the outwardly facing wheel tracks of said second pair of rails and said rear wheels rolling along said outer wheel tracks, wherein said second pair of rails is oriented such that downward forces placed on the front wheels of said fourth cart inhibit development of a horizontal force component tending to move said fourth cart rearwardly into said storage bay.

Preferably, the third cart has a generally U-shaped rail assembly mounted thereon. The rail assembly includes a pair of side members defining the second pair of rails which are bridged by a rear member. The rear member supports the pair of wheels rolling along the inner wheel tracks. Stops are provided on the second pair of rails adjacent the rear ends thereof to inhibit removal of the front wheels of the fourth cart from the second pair of rails.

Preferably, the push back storage rack system further includes a retaining mechanism to inhibit at least one of the carts from inadvertently being pushed rearwardly into the storage bay. In a preferred embodiment, the retaining mechanism is in the form of a resilient strip on the framework positioned to contact the third cart. The strip flexes easily in a forward direction to permit the third cart to roll towards the front of the storage rack. It is more difficult to flex the strip in a rearward direction thereby to retain the third cart adjacent the front of the storage bay when the fourth cart is pushed back into the storage bay. Preferably, the third cart carries a downwardly extending tab which interacts with the strip.

Preferably, each of the carts includes a pair of side members bridged at opposed ends by front and rear members. The side members are laterally spaced apart a distance corresponding to the distance between stringers of conventional pallets. It is also preferred that the side members carry upwardly extending tabs to inhibit sliding of pallets placed on the carts in a forward direction.

According to another aspect of the present invention there is provided a push back storage rack system comprising:

a framework defining a storage bay for multiple pallets including a plurality of generally vertical uprights and a plurality of generally horizontal shelf beams;

a first pair of laterally spaced, generally parallel rails supported by said framework and extending into said storage bay, each of said rails defining inner and outer wheel tracks and being inclined in a direction towards the rear of said storage bay;

a generally rectangular first cart having a pair of front wheels and a pair of rear wheels, said front and rear wheels rolling along said inner wheel tracks;

a generally rectangular second cart behind said first cart having a pair of front wheels and a pair of rear wheels, said front wheels rolling along said inner wheel tracks and said rear wheels rolling along said outer wheel tracks;

a generally rectangular third cart behind said second cart and having a pair of front wheels and a pair of rear wheels, said front and rear wheels rolling along said outer wheel tracks, said third cart supporting a second pair of laterally spaced, generally parallel rails, each rail of said second pair defining an outwardly facing wheel track, the rear of said second pair of rails being supported by a pair of wheels rolling along said inner wheel tracks; and a fourth generally rectangular cart behind said third cart and having a pair of front wheels and a pair of rear wheels, said front wheels rolling along said second pair of rails and said rear wheels rolling along said outer wheel tracks, the wheels of said first, second, third and fourth carts being positioned on said carts so that said carts present generally horizontal support surfaces for pallets.

In still yet another aspect of the present invention there is provided a push back storage rack system comprising:

a framework defining a storage bay for multiple pallets including a plurality of generally vertical uprights and a plurality of generally horizontal shelf beams;

a pair of laterally spaced generally parallel rails supported by said framework and extending into said storage bay, each of said rails defining inner and outer wheel tracks and being inclined in a direction towards the rear of said storage bay;

a plurality of generally rectangular, interlocked carts, each of said carts having pairs of front and rear wheels rolling along said wheel tracks; and a retaining mechanism adjacent the front of said storage bay to inhibit at least one cart from inadvertently being pushed rearwardly into said storage bay when an upper most cart is pushed into said storage bay.

The present invention provides advantages in that the design of the carts inhibits the carts from being double-loaded by pallets as well as inhibits unintentional carry back of the carts as the carts are individually loaded with pallets and pushed back along the wheel tracks into the storage bay. In addition, the present invention provides advantages in that the carts present generally level pallet supporting surfaces and are interlocked to avoid rear cart "hang-ups". Furthermore, the design of the carts inhibits wheels on adjacent carts from contacting one another.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
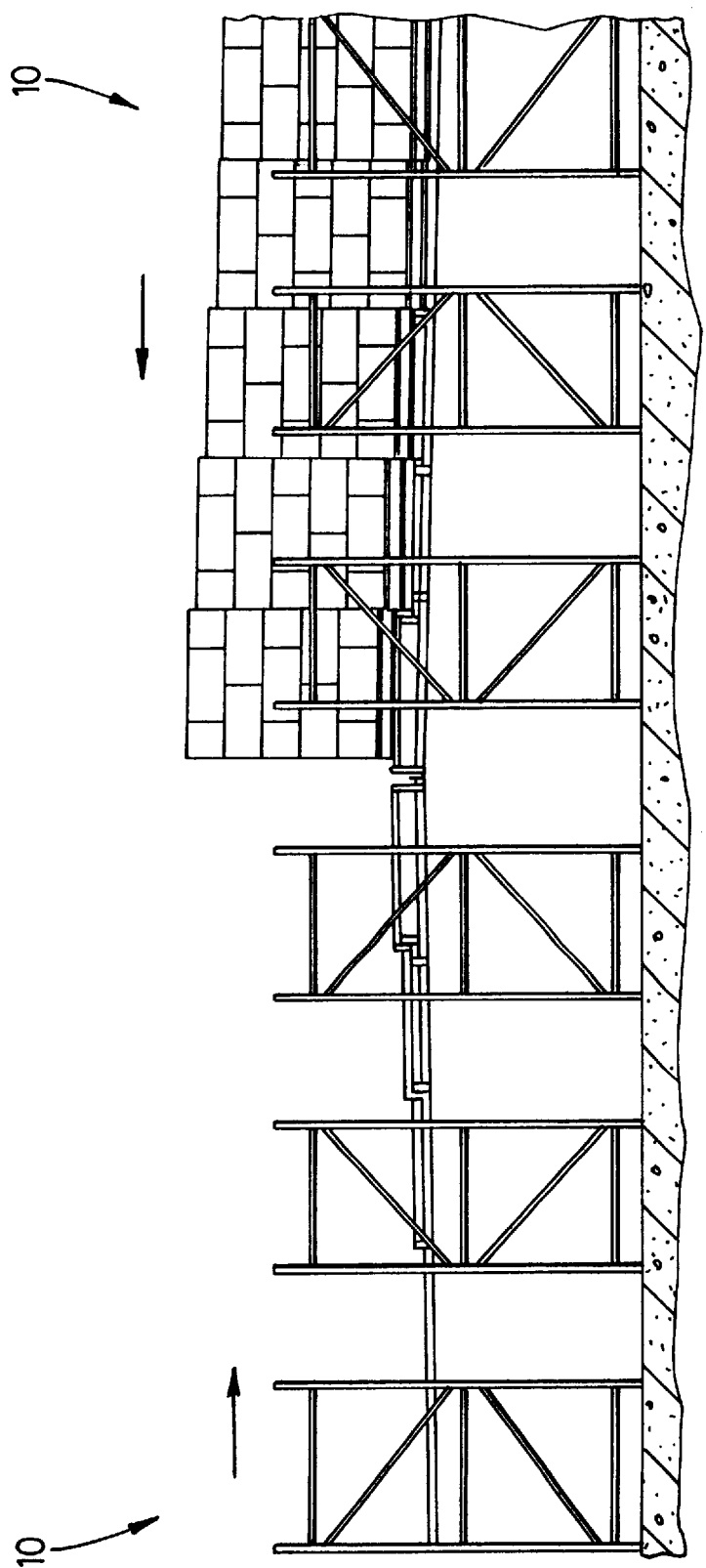
FIG. 1 is a side elevational view of back to back push back storage rack systems in accordance with the present invention.
Figure 2:
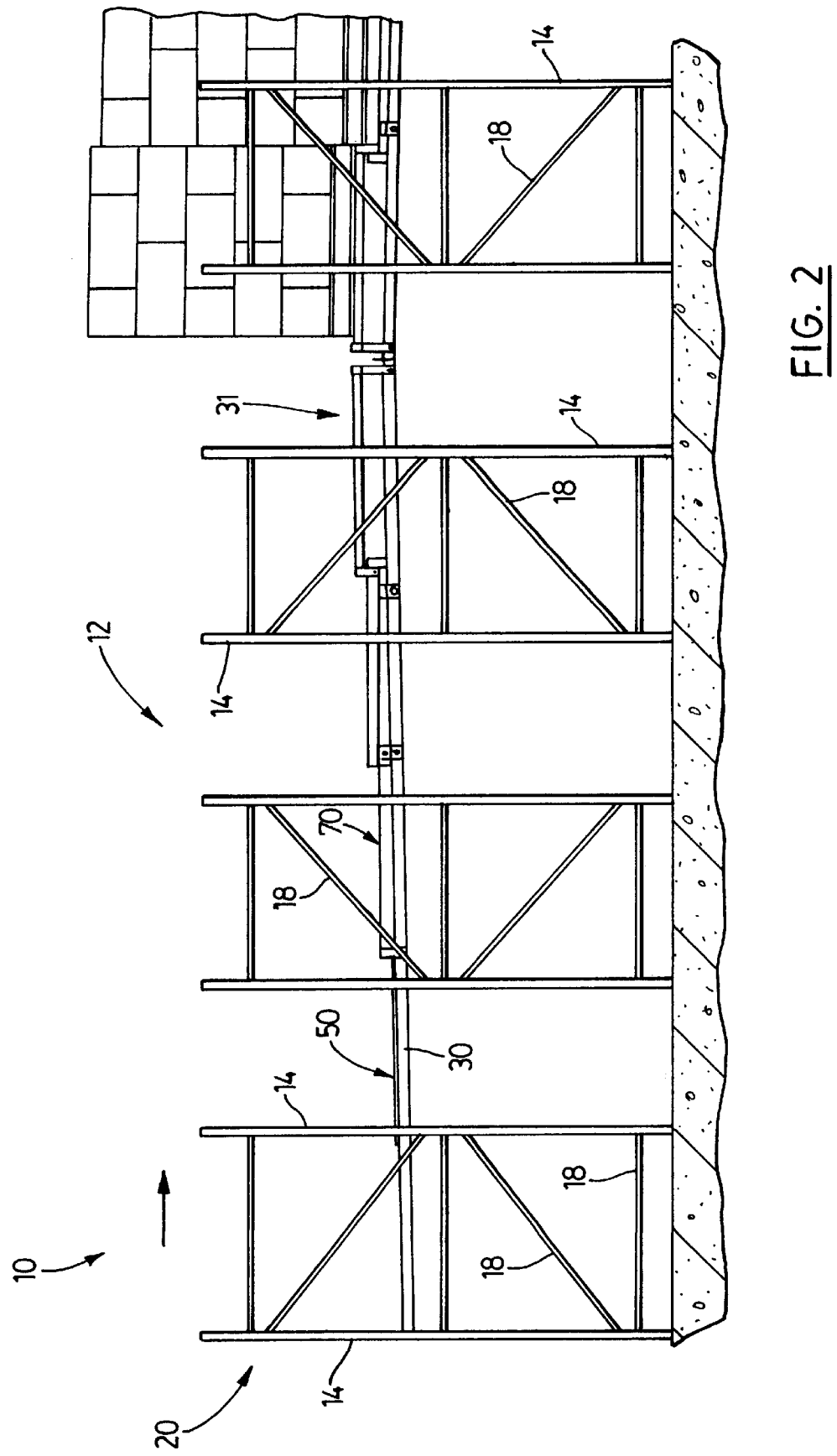
FIG. 2 is an enlarged side elevational view of one of the push back storage rack systems of FIG. 1.
Figure 3:
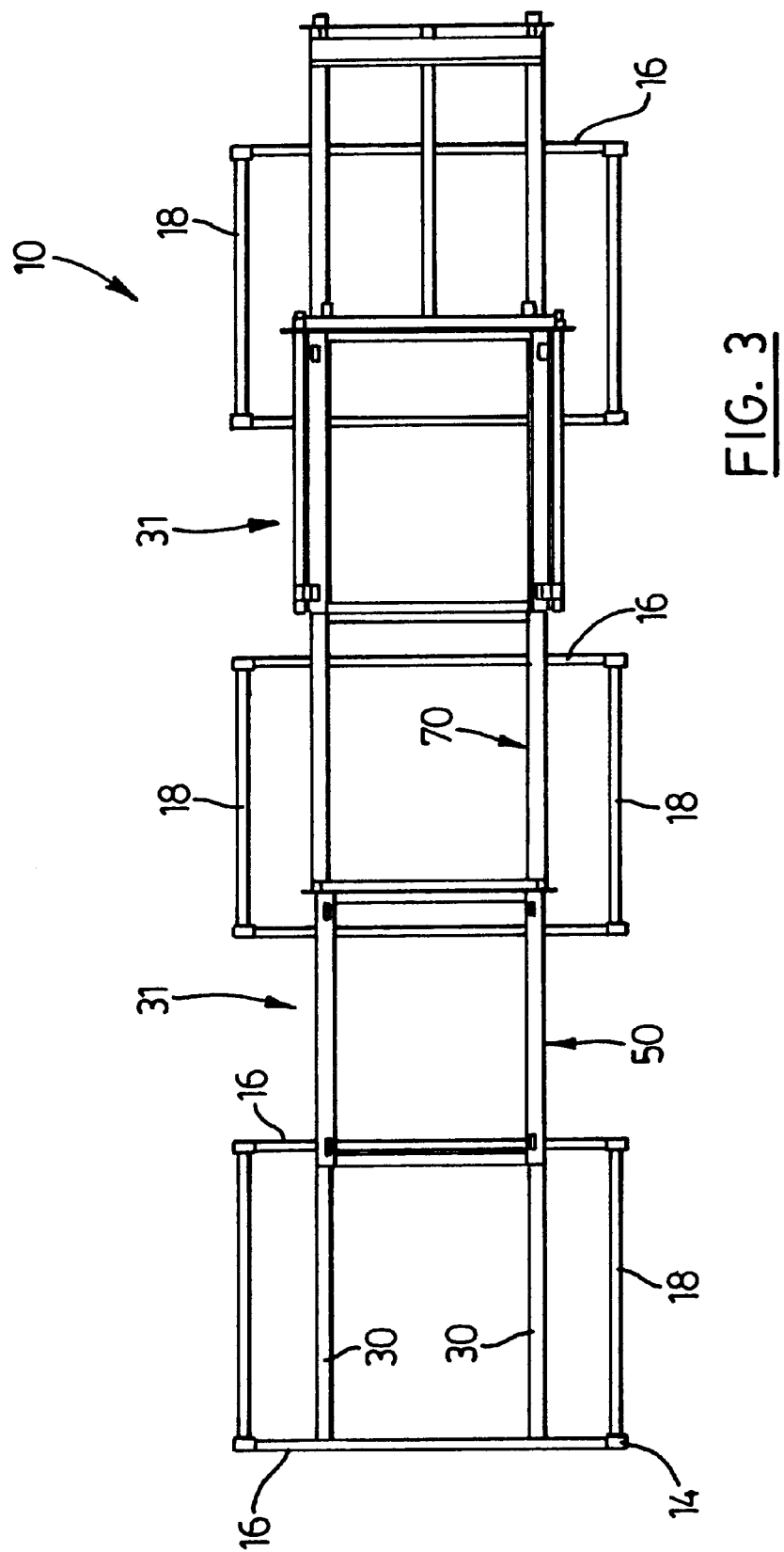
FIG. 3 is a top plan view of the push back storage rack system of FIG. 2.

Referring now to FIGS. 1 to 3, a push back storage rack system is shown and is generally indicated to by reference numeral 10. The push back storage rack system 10 includes a framework 12 having a plurality of generally vertical uprights 14 and a plurality of generally horizontal shelf beams 16. Horizontal and angled supporting crossbars 18 extend between pairs of uprights 14. The framework 12 defines a storage bay 20 for multiple pallets.

A pair of laterally spaced, generally parallel rails 30 extend the depth of the storage bay 20. The rails 30 are secured to the shelf beams 16 and are inclined in a direction towards the rear of the storage bay. A plurality of interlocked, pallet supporting carts generally indicated to by reference numeral 31 are positioned in the storage bay 20 and are moveable along the rails 30. In the present embodiment, the storage bay 20 accommodates four inter-locked carts each positioned one behind the other and provides storage for up to five pallets. The inclination of the rails 30 causes the carts 31 to move to the front of the storage bay 20. When the carts are unloaded, the carts 31 assume a stacked relation with the upper most cart being the only cart whose upper surface is exposed. Each cart is however, moveable inwardly into the storage base to expose the upper surface of the cart below it.

Figure 9:
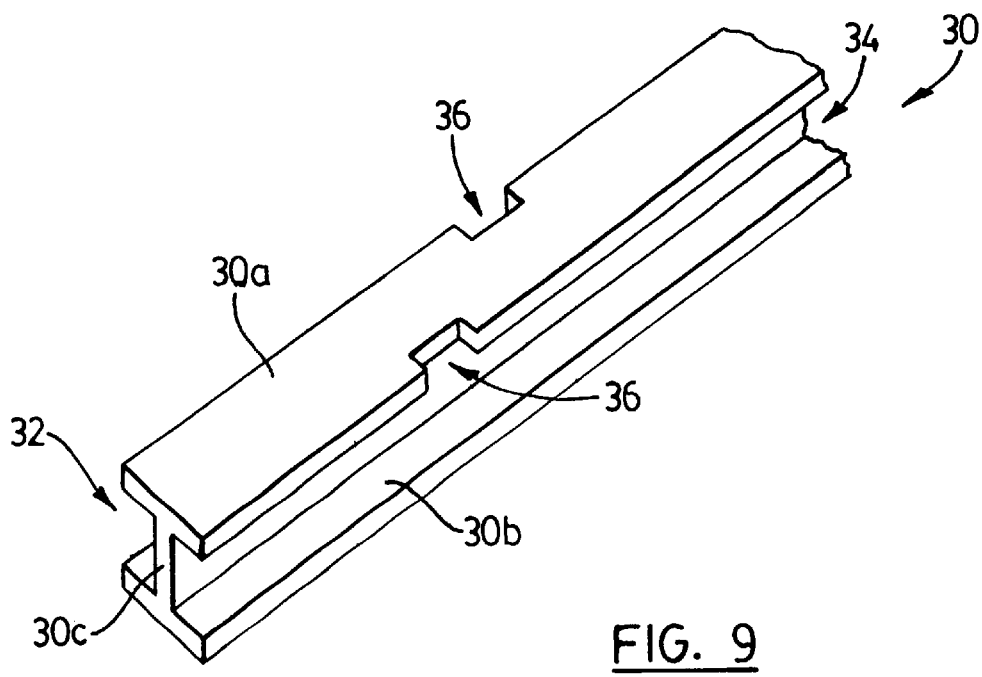
FIG. 9 is a perspective view of a portion of an I-beam forming a rail of the push back storage rack system of FIG. 2.

FIG. 9 shows one of the rails 30 and as can be seen, it is in the form of an I-beam having upper and lower flanges 30a and 30b respectively joined by a central web 30c. The I-beam defines an inner wheel track 32 and an outer wheel track 34. Notches 36 are formed in the upper flange 30a near the front of the storage bay 20 to expose the inner and outer wheel tracks 32 and 34 respectively to facilitate placement and removal of carts from the rail. The upper flange 30a shelters the wheel tracks 32 and 34 to inhibit debris from falling on the running surfaces of the wheel tracks and inhibit the carts from being removed from the wheel tracks if the carts are accidentally lifted.

Figure 10:
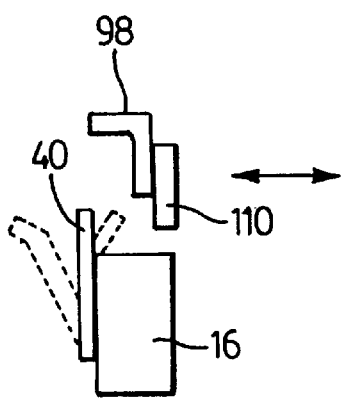
FIG. 10 is a side view of a cart retaining mechanism forming part of the push back storage rack system of FIG. 2.

A tempered steel strip 40 (see FIG. 10) is mounted on and extends upwardly from the shelf beam 16 near the front of the storage bay 20. The strip 40 is positioned to contact the third cart as that cart moves towards the front of the storage bay 20. The strip 40 flexes easily in a forward direction to allow the third cart to roll along the rails 30 to the front of the storage bay. The strip 40 however requires a significant force to flex in the opposite direction thereby to inhibit accidental carry back of the third cart into the storage bay 20 when the fourth cart is loaded with a pallet and pushed back into the storage bay.

Figure 4A:
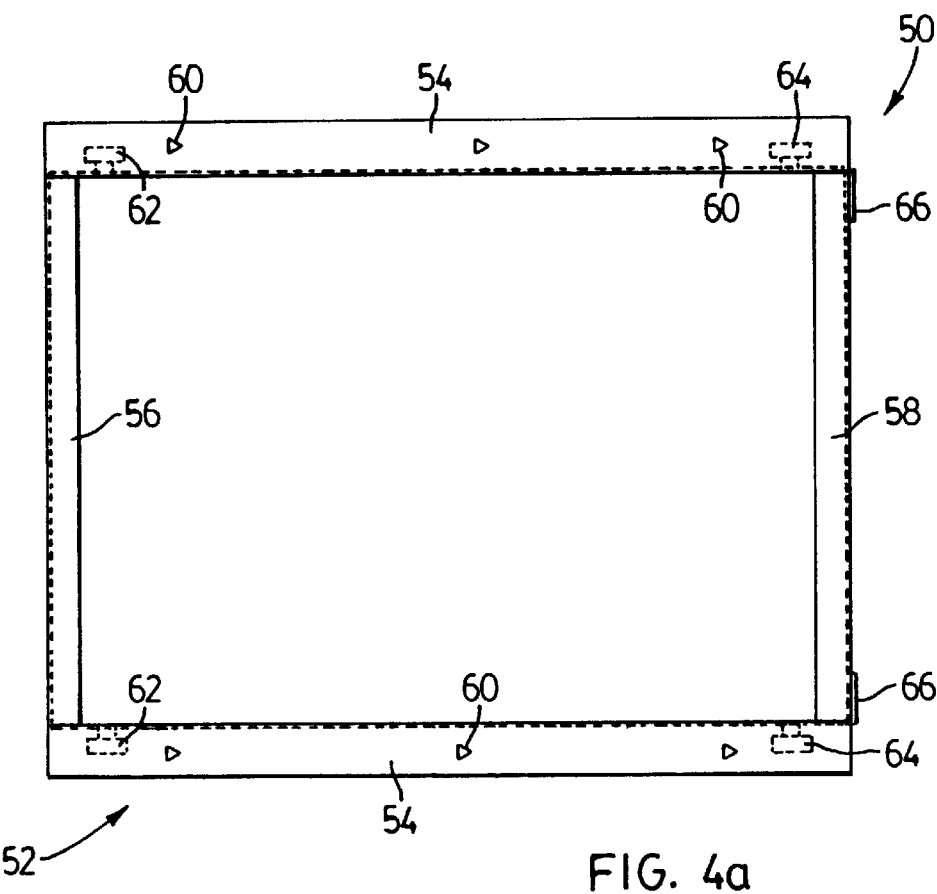
FIGS. 4a and 4b are top plan and side elevational views respectively of a first cart forming part of the push back storage rack system of FIG. 2.
Figure 4B:
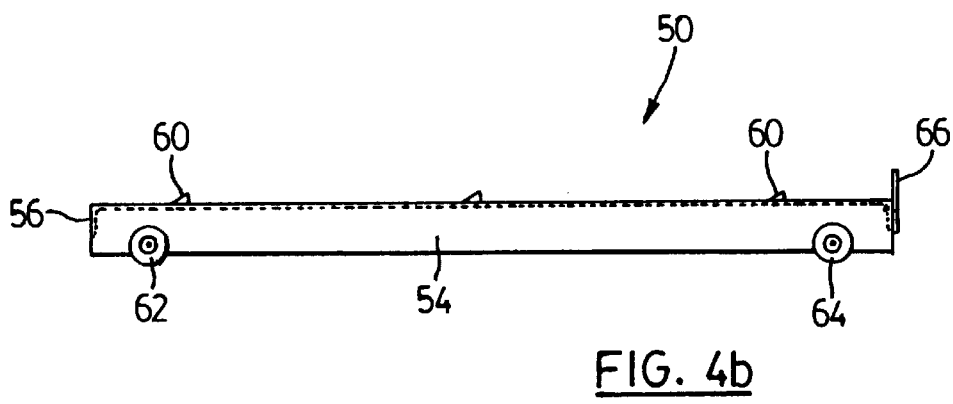

Referring now to FIGS. 4a and 4b, the first cart is better illustrated and is generally indicated to by reference numeral 50. First cart 50 includes a generally rectangular open frame 52 constituted by a pair of side members 54 bridged at their opposed ends by front and rear members 56 and 58 respectively. The side, front and rear members are in the form of structural angles including pairs of plates arranged at right angles. Sharp tabs 60 are punched in the upper plate of each side member 54 and project upwardly. The tabs 60 inhibit pallets from moving forward once placed on the cart 50.

Front and rear pairs of wheels 62 and 64 respectively are rotatably mounted on the upright plates of the side members 54 and roll along the inner wheel tracks 32 of the rails 30. The front wheels 62 are positioned below the rear wheels 64 to offset the inclination of the rails 30 so that the frame 52 of the cart 50 remains in a generally horizontal disposition. Laterally spaced tabs 66 extend upwardly from the rear member 58 and engage the second cart thereby to interlock the first and second carts.

Figure 5A:
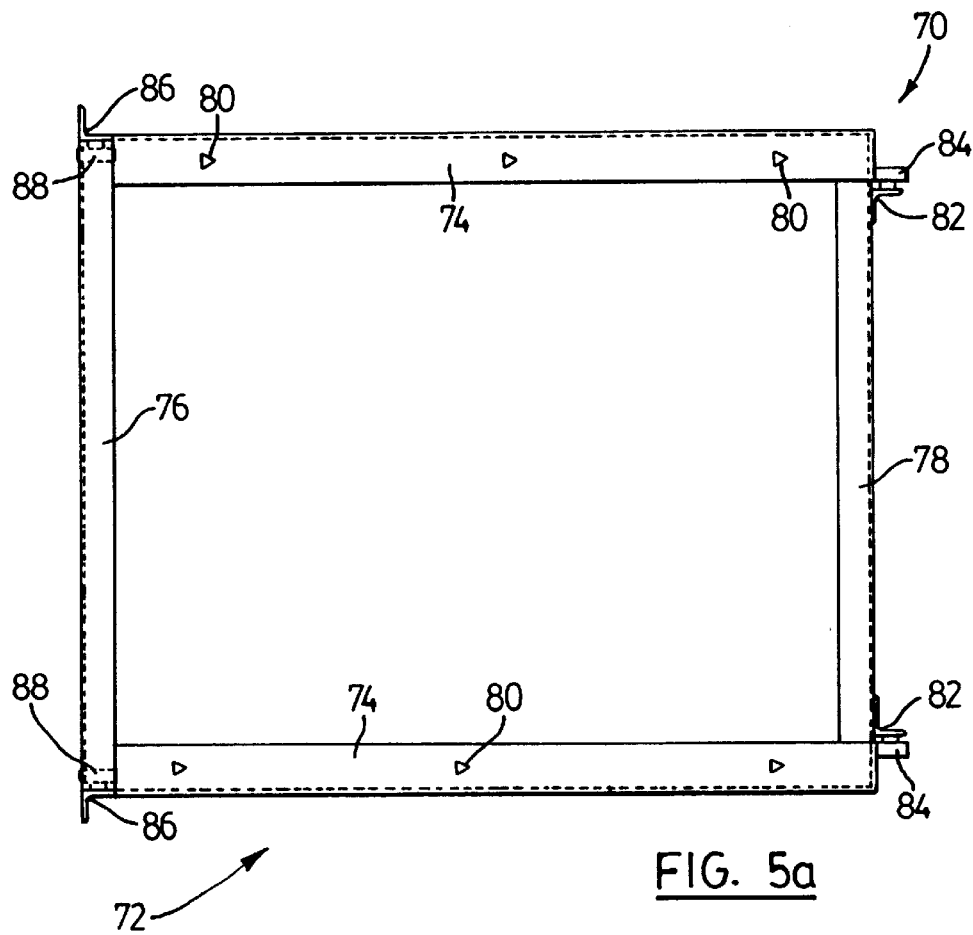
FIGS. 5a and 5b are top plan and side elevational views respectively of a second cart forming part of the push back storage rack system of FIG. 2.
Figure 5B:
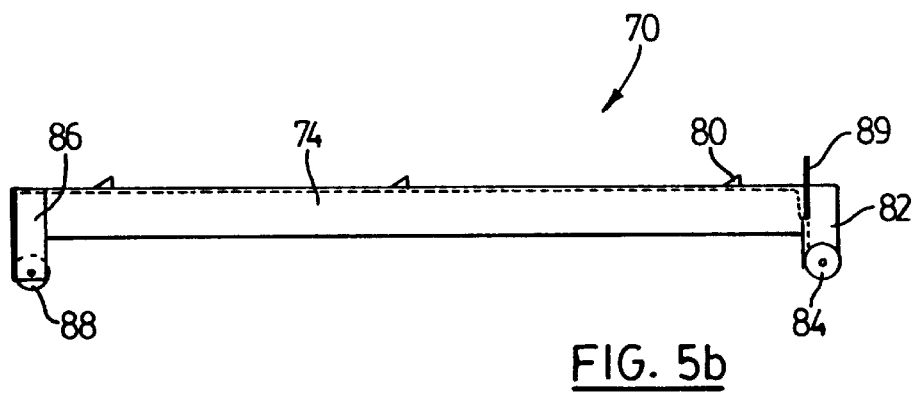

FIGS. 5a and 5b better illustrate the second cart 70 which is positioned behind the first cart 50. The second cart 70 also includes a generally rectangular open frame 72 constituted by a pair of side members 74 bridged at their opposed ends by front and rear members 76 and 78 respectively. The side, front and rear members are in the form of structural angles including pairs of plates arranged at right angles. Sharp tabs 80 are punched in the upper plate of each side member 74 and project upwardly. The tabs 80 inhibit pallets from moving forward once placed on the cart 70. Legs 82 in the form of structural angles are secured to the rear member 78 and extend below the frame 72. Outwardly facing rear wheels 84 are rotatably mounted on the legs 82 below the frame 72 and roll along the inner wheel tracks 32 of the rails 30. Legs 86 in the form of structural angles are also secured to the ends of the front member 76 and extend below the frame 72. Inwardly facing front wheels 88 are rotatably mounted on the legs 86 below the frame 72 and roll along the outer wheel tracks 34 of the rails 30. The front wheels 88 are positioned below the rear wheels 84 to offset the inclination of the rails 30 so that the frame 72 of cart 70 remains in a generally horizontal disposition. Laterally spaced tabs 89 extend upwardly from the rear member 78 and engage the third cart thereby to interlock the second and third carts.

Figure 6A:
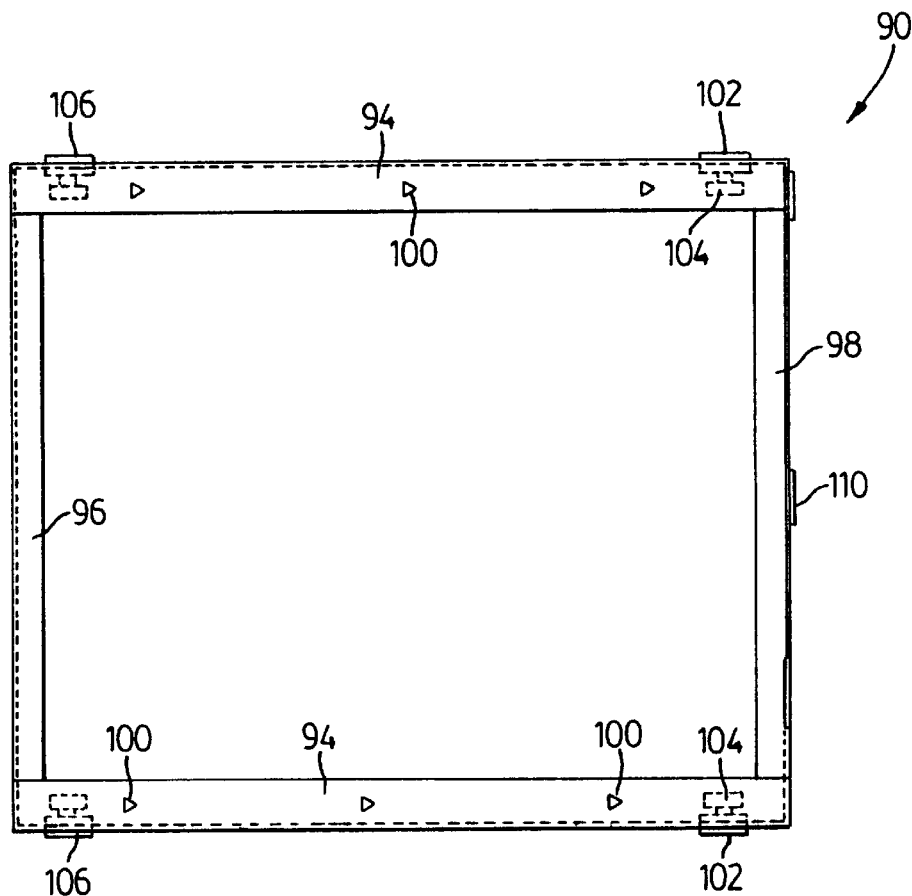
FIGS. 6a and 6b are top plan and side elevational views respectively of the main body of a third cart forming part of the push back storage rack system of FIG. 2.
Figure 6B:
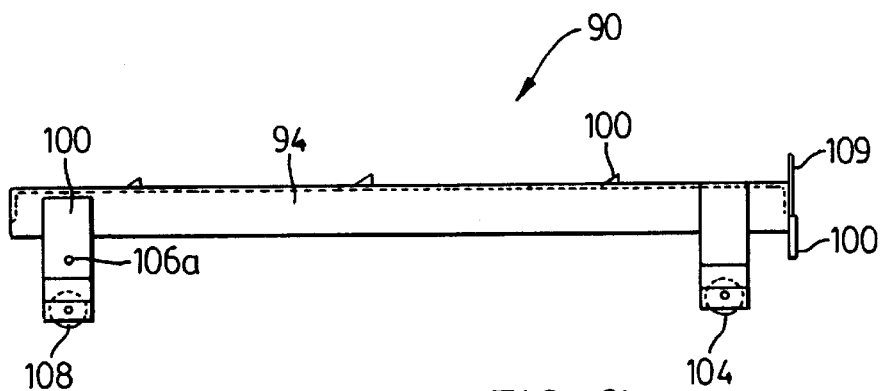

Referring now to FIGS. 6a and 6b, the third cart 90 is better illustrated. As can be seen, the third cart 90 includes a generally rectangular open frame 92 constituted by a pair of side members 94 bridged at their opposed ends by front and rear members 96 and 98 respectively. The side, front and rear members are in the form of structural angles including pairs of plates arranged at right angles. Sharp tabs 100 are punched in the upper plate of the each member 94 and project upwardly. The tabs 100 inhibit pallets from moving forward once placed on the cart. Legs 102 in the form of structural angles depend from the upright plates of the side members 94 near the rear member 98 and extend below the frame 92. A hole 106a is provided through each leg 106 intermediate its length. Inwardly facing rear wheels 104 are rotatably mounted on the legs 102 and roll along the outer wheel tracks 34 of the rails 30. Legs 106 in the form of structural angles also depend from the upright plates of the side members 94 near the front member 96 and extend below the frame 92. A hole 106a is provided through each leg 106 intermediate its length. Inwardly facing front wheels 108 are rotatably mounted on the legs 106 and roll along the outer wheel tracks 34 of the rails. The front wheels 108 are positioned below the rear wheels 104 to offset the inclination of the rails 30 so that the frame 92 of the cart 90 remains in a generally horizontal disposition. A pair of laterally spaced tabs 109 extend upwardly from the rear member 98 and a centrally located tab 110 extends downwardly from the rear member 98. The tab 110 and strip 40 act to form a retaining mechanism for the third cart when it is positioned adjacent the front of the storage bay 20. The tabs 109 engage the fourth cart thereby to interlock the third and fourth carts.

Figure 7A:
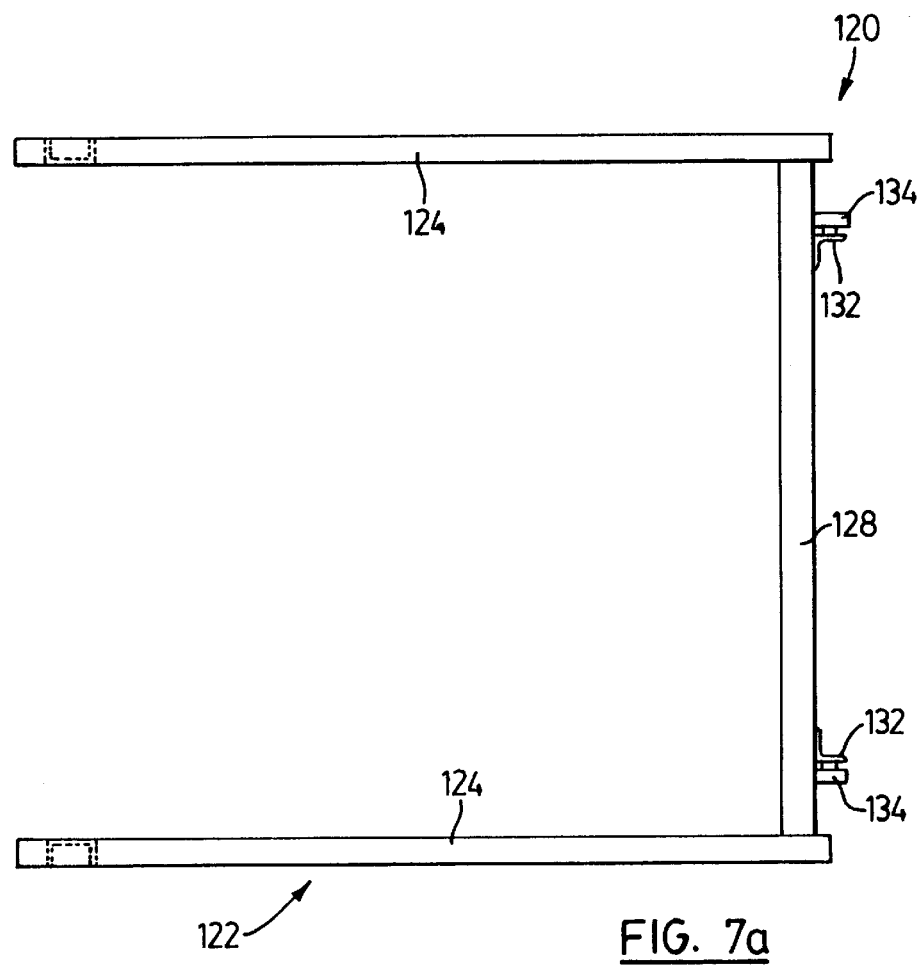
FIGS. 7a and 7b are top plan and side elevational views respectively of a rail assembly mounted on the third cart of FIGS. 6a and 6b.
Figure 7B:
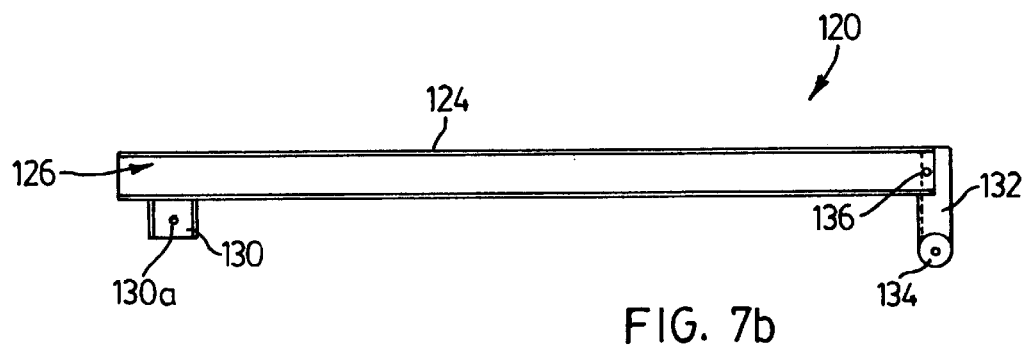

FIGS. 7a and 7b best illustrate a rail assembly 120 mounted on the third cart 90. As can be seen, the rail assembly 120 includes a generally U-shaped frame 122 constituted by a pair of side channel members 124 defining outwardly facing wheel tracks 126 bridged at their rear ends by a rear member 128. Each side member 124 is supported on the third cart 90 by way of a foot 130 near its distal end. Each foot 130 has a hole 130a provided through it which aligns with one of the holes 106a. Fasteners (not shown) in the form of nuts and bolts pass through the holes 130a and 106a to secure the rail assembly 120 to the third cart 90. Spaced legs 132 depend from the rear member 128 and rotatably support outwardly facing wheels 134. The wheels 134 roll along the inner wheel tracks 32 of the rails 30. A hole 136 is also provided through each side member 124 near its rear end. A bolt (not shown) extends through each hole 136 and is sufficiently long to inhibit wheels from rolling out of the wheel tracks 126.

Figure 8A:
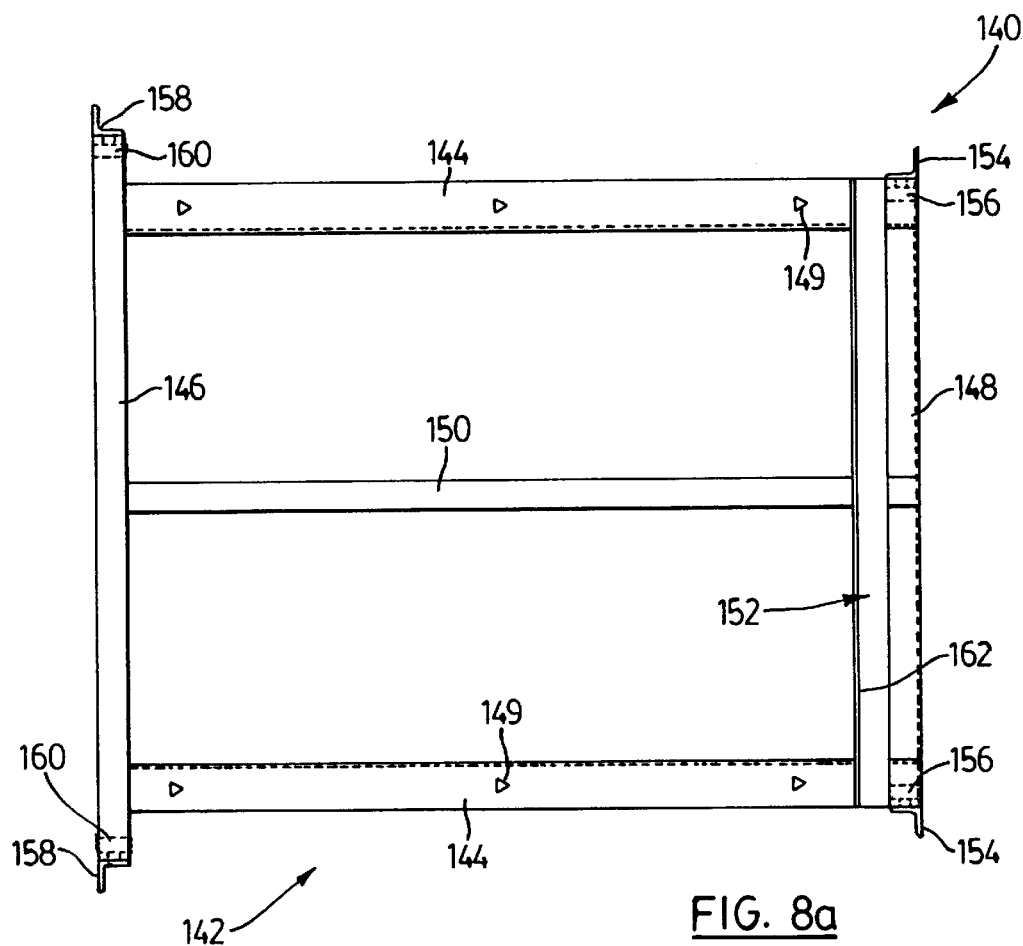
FIGS. 8a and 8b are top plan and side elevational views of a fourth cart forming part of the push back storage rack system of FIG. 2.
Figure 8B:
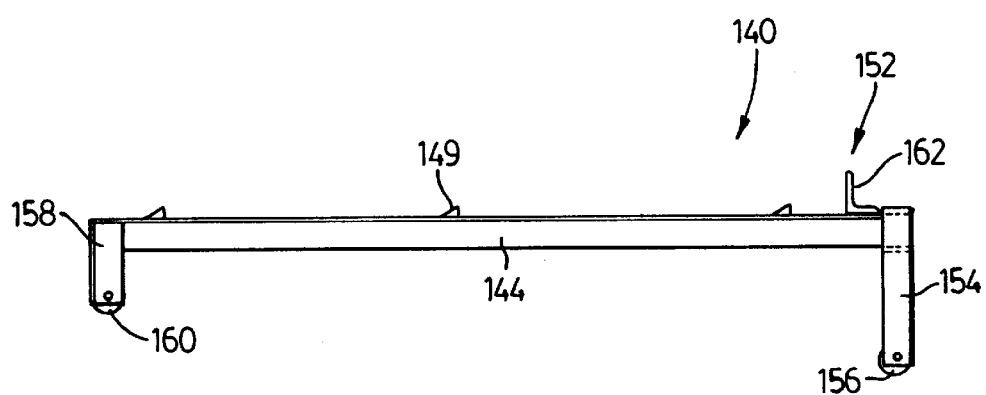

Referring now to FIGS. 8a and 8b, the fourth cart 140 is better illustrated. As can be seen, the fourth cart includes a generally rectangular open frame 142 constituted by a pair of side members 144 bridged by front and rear members 146 and 148 respectively at their opposed ends. The side and rear members are in the form of structural angles including pairs of plates arranged at right angles. Sharp tabs 149 are punched in the upper surface of each side member 144 and project upwardly to inhibit pallets from moving forward once placed on the cart. The front member 146 is tubular and extends beyond both of the side members 144. A central longitudinal, tubular cross-member 150 spans the front and rear members 146 and 148. A second cross-member 152 spans the side members 144 near to but spaced from the rear member 148. One of the plates 162 of the cross-member 152 extends upwardly and functions as a push plate. Legs 154 in the form of structural angles depend from the opposed ends of the rear member 148. Inwardly facing rear wheels 156 are rotatably mounted on the legs 154 and roll along the outer wheel tracks 32 of rails 30. Legs 158 in the form of structural angles also depend from the ends of the front member 146. Inwardly facing front wheels 160 are rotatably mounted on the legs 158 and roll along the wheel tracks 126 defined by side members 124 of the rail assembly 120. As mentioned above, the bolts extending through the holes 136 inhibit the wheels 160 from being removed from the wheel tracks 126. The length of the legs 158 relative to the legs 154 is such that the position of the front wheels 160 relative to the rear wheels 156 maintain the frame 142 in a generally horizontal disposition.

When no pallets are placed on the carts, the inclination of the rails 30 causes the carts to remain at the front of the storage bay 20 in a stacked relation. The carts overlap so that the upper surface of the fourth cart 140 is the only cart on which a pallet can be placed. When a pallet is to be loaded into the storage bay 20, the pallet is placed on the frame 142 of the cart 140 so that the back of the pallet contacts the push plate 162. The inclination of the channel members 124 defining the wheel tracks 126 is such to inhibit the development of a horizontal force component tending to move the fourth cart 140 rearwardly into the storage bay 20 along the wheel tracks 126 when the fourth cart is loaded with a pallet.

When the next pallet is to be loaded into the storage bay 20, the pallet is pushed against the pallet on the fourth cart 140 causing the fourth cart to roll along the wheel tracks 126 and 34 into the storage bay 20 and expose the third cart 110. The retaining mechanism constituted by the tab 110 and the strip 40 inhibits the third cart 110 from being carried back into the storage bay 20 by the fourth cart 140. When the third cart is exposed, the pallet is placed on the frame of the third cart. Loading of pallets onto the remaining carts is achieved in the same manner.

Once pallets have been loaded onto the four carts, an additional pallet can be loaded onto the framework 12 at the front of the storage bay 20 by pushing the first cart 50 into the storage bay and placing the additional pallet on the rails 30 so that the pallet also rests on the front shelf beam 16 of the framework. The front shelf beam of the framework 12 is elevated to compensate for the inclination of the rails so that the additional pallet remains in a generally horizontal disposition.

As pallets are removed from the storage bay, the carts roll towards the front of the storage bay due to the inclination of the rails 30 so that a pallet is always positioned at the front of the storage bay 20 and is accessible. The tabs on the rear member of each cart contact the interior side surfaces of the front member of the cart behind it to interlock the carts. Thus, several loaded carts must roll together towards the front of the storage bay 20. If a "hang-up" should occur, the hung up cart can only be hung up a distance equal to one pallet position.

The wheels on the various carts are arranged so that wheel load forces are transferred to the rails 30 such that no two sets of wheels act on one local area of the rails thereby to minimize torsional effects on the rails. This allows the amount of steel required for the flanges of the I-beams to be reduced. The width of each cart is selected so that the side members of each cart are positioned to align generally with the stringers of conventional pallets. The depth of the carts is such that once the fourth cart is loaded with a pallet which contacts the push plate 162, the pallet extends slightly beyond the front of the cart. Thus, the pallet on the fourth cart serves as a push plate for the next pallet to be loaded on the third cart. All pallets loaded on subsequent carts extend slightly beyond the front of the respective carts. Since the pallets extend beyond the front of the carts, the carts cannot be double loaded and support more than one pallet.

Although the carts are described as having open generally rectangular frames, the tops of the carts can be covered with a sheet of steel or other suitable material in cases where additional support is desired and/or when pallets are structurally weak.

Although a preferred embodiment of the present invention has been described, it should be apparent to those of skill in the art that variations and modifications may be made to the present invention without departing from the spirit and scope thereof as defined by the appended claims.

I claim:

1. A push back storage rack system comprising:
    a framework defining a storage bay for multiple pallets including a plurality of generally vertical uprights and a plurality of generally horizontal shelf beams;
    a first pair of laterally spaced, generally parallel first rails supported by said framework and extending into said storage bay, each of said first rails defining inner and outer wheel tracks and being inclined in a direction towards a rear of said storage bay;
    a generally rectangular first cart having a pair of front wheels and a pair of rear wheels, said front and rear wheels positioned for rolling engagement along said inner wheel tracks;
    a generally rectangular second cart positioned behind said first cart and having a pair of front wheels and a pair of rear wheels, said front wheels positioned for rolling engagement along said outer wheel tracks and said rear wheels positioned for rolling engagement along said inner wheel tracks;
    a generally rectangular third cart positioned behind said second cart and having a pair of front wheels and a pair of rear wheels, said front and rear wheels positioned for rolling engagement along said outer wheel tracks, said third cart supporting a pair of laterally spaced, generally parallel second rails, each second rail defining an outwardly facing wheel track, said pair of second rails being supported by a pair of second rail supporting wheels positioned for rolling engagement along said inner wheel tracks; and
    a fourth generally rectangular cart positioned behind said third cart and having a pair of front wheels and a pair of rear wheels, said front wheels positioned for rolling engagement along the outwardly facing wheel tracks of said pair of second rails and said rear wheels positioned for rolling engagement along said outer wheel tracks, wherein said pair of second rails is oriented such that downward forces placed on the front wheels of said fourth cart inhibit development of a horizontal force component tending to move said fourth cart rearwardly into said storage bay.

2. A push back storage rack as defined in claim 1 wherein said third cart has a generally U-shaped rail assembly mounted thereon, said rail assembly including a pair of side members defining said pair of second rails bridged by a rear member, said rear member being supported by said pair of second rail supporting wheels.

3. A push back storage rack system as defined in claim 2 further including stops on said pair of second rails adjacent rear ends thereof to inhibit removal of the front wheels of said fourth cart from the outwardly facing wheel tracks of said second rails.

4. A push back storage rack system as defined in claim 1 further comprising a retaining mechanism to inhibit at least one of said carts from inadvertently being carried into said storage bay with an upper cart when the upper cart is pushed into said storage bay.

5. A push back storage rack system as defined in claim 4 wherein said retaining mechanism is in the form of a resilient strip on said framework positioned to contact said third cart.

6. A push back storage rack system as defined in claim 5 wherein said third cart is provided with a downwardly extending tab thereon to interact with said strip.

7. A push back storage rack system as defined in claim 1 wherein said pair of first rails is in the form of I-beams defining said inner and outer wheel tracks, an upper flange of each of said I-beams having notches provided therein to expose said inner and outer wheel tracks to facilitate entry of the wheels of said carts into said inner and outer wheel tracks.

8. A push back storage rack system as defined in claim 1 wherein each of said carts includes upwardly extending tabs thereon to inhibit sliding of pallets placed on said carts in a forward direction.

9. A push back storage rack system as defined in claim 1 wherein said fourth cart includes a push plate thereon adjacent a rear end thereof, said push plate being positioned so that a pallet placed on said fourth cart and abutting said push plate extends beyond a front end thereof.

10. A push back storage rack system as defined in claim 1 wherein each of said carts includes a pair of side members bridged at opposed ends by front and rear members, said side members being laterally spaced apart a distance corresponding to the distance between stringers of pallets.

11. A push back storage rack system comprising:
    a framework defining a storage bay for multiple pallets including a plurality of generally vertical uprights and a plurality of generally horizontal shelf beams;

a pair of laterally spaced, generally parallel first rails supported by said framework and extending into said storage bay, each of said first rails defining inner and outer wheel tracks and being inclined in a direction towards a rear of said storage bay;

a generally rectangular first cart having a pair of front wheels and a pair of rear wheels, said front and rear wheels for rolling engagement along said inner wheel tracks;

a generally rectangular second cart positioned behind said first cart having a pair of front wheels and a pair of rear wheels, said front wheels positioned for rolling engagement along said outer wheel tracks and said rear wheels positioned for rolling engagement along said inner wheel tracks;

a generally rectangular third cart positioned behind said second cart and having a pair of front wheels and a pair of rear wheels, said front and rear wheels positioned for rolling engagement along said outer wheel tracks, said third cart supporting a pair of laterally spaced, generally parallel second rails, each second rail defining an outwardly facing wheel track, said pair of second rails being supported by a pair of second rail supporting wheels positioned for rolling engagement along said inner wheel tracks; and a fourth generally rectangular cart positioned behind said third cart and having a pair of front wheels and a pair of rear wheels, said front wheels positioned for rolling engagement along the outwardly facing wheel tracks of said pair of second rails and said rear wheels positioned for rolling engagement along said outer wheel tracks, the wheels of said first, second, third and fourth carts being positioned on said carts to offset the inclination of said first rails so that said carts present generally horizontal support surfaces for pallets.

12. A push back storage rack system as defined in claim 11 further comprising a retaining mechanism to inhibit at least one of said carts from inadvertently being pushed rearwardly carried into said storage bay with an upper cart when the upper cart is pushed into said storage bay.

13. A push back storage rack system as defined in claim 12 wherein said retaining mechanism is in the form of a resilient strip on said framework positioned to contact said third cart.

14. A push back storage rack system as defined in claim 13 wherein said third cart is provided with a downwardly extending tab thereon to interact with said strip.

15. A push back storage rack system as defined in claim 11 wherein each of said carts includes upwardly extending tabs thereon to inhibit sliding of pallets placed on said carts in a forward direction.

16. A push back storage rack system as defined in claim 11 wherein said fourth cart includes a push plate thereon adjacent a rear end thereof, said push plate being positioned so that a pallet placed on said fourth cart and abutting said push plate extends beyond a front end thereof.

17. A push back storage rack system as defined in claim 11 wherein each of said carts includes a pair of side members bridged at opposed ends by front and rear members, said side members being laterally spaced apart a distance corresponding to the distance between stringers of pallets.

18. A push back storage rack system comprising:

a framework defining a storage bay for multiple pallets including a plurality of generally vertical uprights and a plurality of generally horizontal shelf beams;

a pair of laterally spaced generally parallel rails supported by said framework and extending into said storage bay, each of said rails defining inner and outer wheel tracks and being inclined in a direction towards a rear of said storage bay;

a plurality of generally rectangular, interlocked carts positioned one behind the other, each of said carts having pairs of front and rear wheels positioned for rolling engagement along said wheel tracks; and a retaining mechanism adjacent a front of said storage bay to inhibit at least one cart from inadvertently being carried into said storage bay with an uppermost cart when said uppermost cart is pushed into said storage bay, said retaining mechanism being in the form of a resilient strip on said framework positioned to contact said at least one cart.

19. A push back storage rack system as defined in claim 18 wherein said at least one cart is provided with a downwardly extending tab thereon to interact with said strip.

* * * * *